United States Patent

Wood et al.

[11] Patent Number: 5,098,169
[45] Date of Patent: Mar. 24, 1992

[54] MAGNET VALVE SAFETY CHECK AND FAULT INDICATION INTEGRATOR

[75] Inventors: James A. Wood, Spartanburg; John W. Drake, Greenville, both of S.C.

[73] Assignee: Westinghouse Air Brake Company, Wilmerding, Pa.

[21] Appl. No.: 600,798

[22] Filed: Oct. 22, 1990

[51] Int. Cl.⁵ .............................................. B60T 8/88
[52] U.S. Cl. ............................... 303/92; 188/181 C; 303/20; 303/107; 303/103; 364/426.01
[58] Field of Search .................... 303/92, 20, 95, 96, 303/100, 102, 103, 3, 104, 107; 364/426.01, 426.02, 426.03; 324/160, 207.11, 225; 180/197; 188/181 C

[56] References Cited

U.S. PATENT DOCUMENTS

| | | |
|---|---|---|
| 4,598,953 | 7/1986 | Wood et al. .............................. 303/92 |
| 4,941,099 | 7/1990 | Wood et al. ...................... 303/107 X |
| 4,972,145 | 11/1990 | Wood et al. ....................... 393/92 X |
| 4,999,779 | 3/1991 | Wood et al. ........................ 303/92 X |

Primary Examiner—Douglas C. Butler
Attorney, Agent, or Firm—G. J. Falce

[57] ABSTRACT

A magnet valve safety check and fault indication integrator including a first comparator for selecting the highest axle speed of a vehicle, a second comparator for determining whether the highest axle speed is less than a preset speed, an indicator for indicating if the vehicle is stopped, a timer for determining if the vehicle has been stopped for a predetermined time, a first sensor for sensing a transition from a braking mode to a power mode, an inhibit device for inhibiting all magnet valve feedback faults when the vehicle is stopped and in a brake mode for a period longer than the predetermined time, a timer circuit for ascertaining if a wheel slip is not in progress for a certain time period, a check circuit for monitoring the magnet valve feedback to determine if the magnet valve is not in an application state, a magnet valve cutout device for holding a cutout request until it is reset by a station stop signal, an event recorder for indicating that the vehicle speed is not less than the preset speed, a safety timer for designating a wheel slip inhibit in not in effect, a fault sensor for selectively blocking or passing a valve cutout request, an interface circuit for receiving three safety functions, and a code generation circuit for receiving the wheel slip inhibit event, the safety-timer event and the feedback fault for being logged one for every brake to power transition.

16 Claims, 1 Drawing Sheet

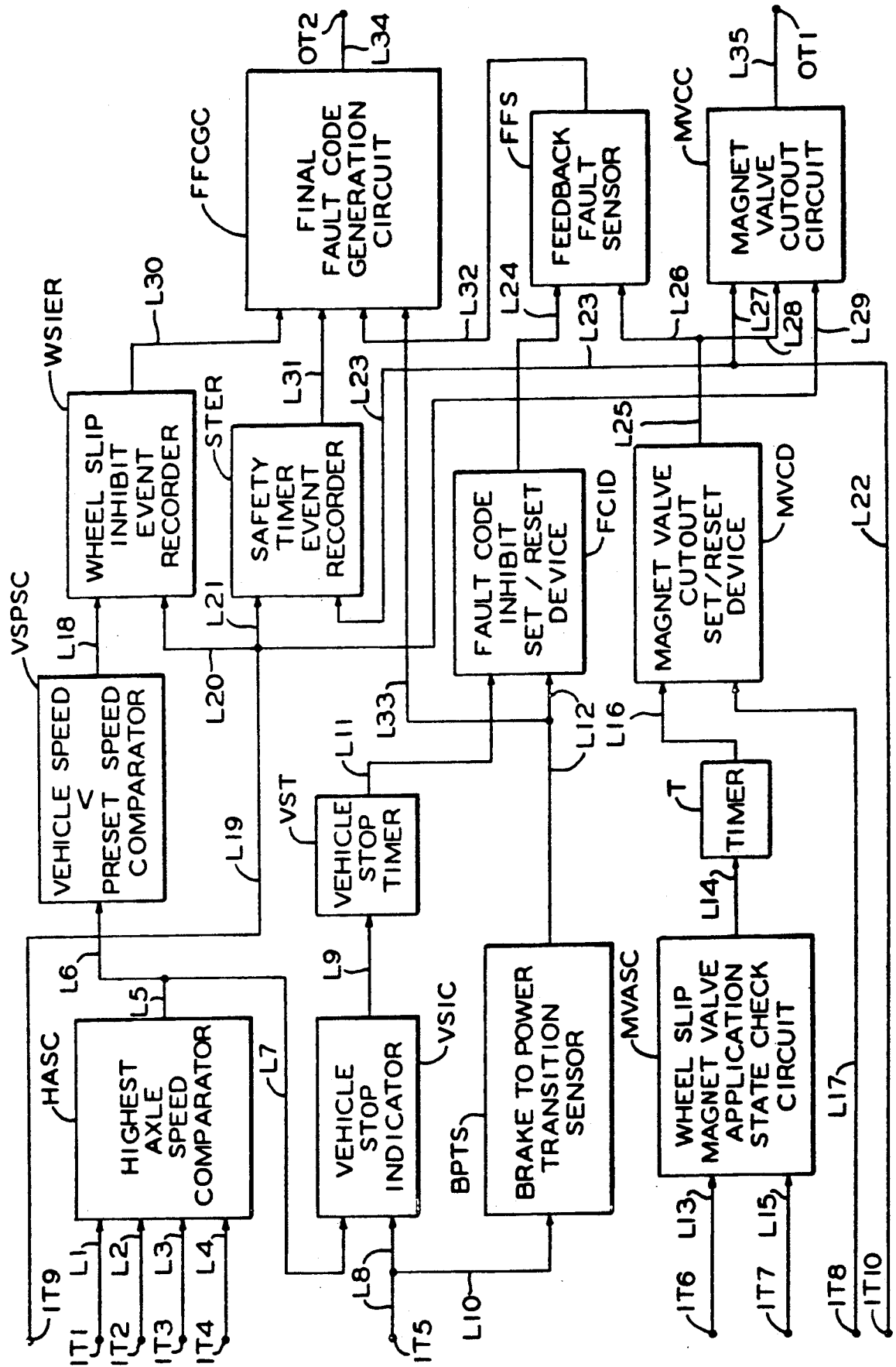

MAGNET VALVE SAFETY CHECK AND FAULT INDICATION INTEGRATOR

FIELD OF THE INVENTION

This invention relates to a wheel slip magnet valve safety check and fault indication integrator and more particularly to an arrangement for integrating three (3) wheel slip control safety functions, namely, safety timer, wheel slip inhibit, and magnet valve feedback check and correlating their respective diagnostic fault indications which are employed to provide useful operational event information for an electronic wheel slip control system for a railway vehicle.

BACKGROUND OF THE INVENTION

It will be appreciated that, in railway and mass and/or rapid transit operations, it was common practice in a complex logic wheel slip and brake control system for an operator to manually actuate the wheel slip inhibit and additionally to have a safety timer and magnet valve state feedback functions to establish safeguards and to control the operational event recorder. In the past, it has been found that during maintenance periods, a problem occurs due to the continuous monitoring of the magnet valve. That is, if the connector of the magnet valve is disconnected in the shop while the vehicle is being powered up or if the car batteries are being slowly discharged, this will cause the magnet valve to drop out before the electronic unit drops out. Thus, the cutout of the valve will be dropped and a fault will be erroneously logged. In addition, another problem occurs with the wheel slip inhibit function during yard tests of trains. These pre-operational tests require the repeated actuation of the wheel slip inhibit function which previously resulted in unwanted event records being logged. Also, when the wheel slip inhibit function causes a wheel slip, namely, a lockup condition, on one axle, it could cause or create a situation which could result in an abnormal safety timeout function. Both of these anomalous events are recorded in the operational event recording log which could result in possible confusion during troubleshooting maintenance periods. Thus, it is desirable to avoid the shortcomings of the previous wheel slip control systems.

OBJECTS AND SUMMARY OF THE INVENTION

Accordingly, it is an object of this invention to provide a novel magnet valve safety check and fault indication integrator.

Another object of this invention is to provide a new electronic system for integrating a wheel slip inhibit event, a safety timer event, and feedback fault by a final fault code generation circuit.

A further object of this invention is to provide a unique process for comprehensively handling the operation of wheel slip control valve safety and the intelligent determination and reporting of faults in a single interface.

Still another object of this invention is to provide an improved integrator arrangement for combining a wheel slip inhibit function, a safety timer output and a magnet valve feedback function.

Still a further object of this invention is to provide a magnet valve safety check and fault indication integrator comprising, means for selecting the highest axle speed of a plurality of wheel axle units of a railway vehicle, means for comparing the highest axle speed to a present speed for producing a logical output signal means for indicating the first vehicle is stopped by comparing the highest speed with a preset speed limit, means for sensing a transition from a braking mode to a power mode for producing a logical output signal means for timing that the highest speed is less than the preset speed limit and in a brake mode for predetermined time for producing a logical output signal, fault code inhibit means being set by the logical output signal of the timing means a being reset by the logical output signal of the transition means, means for determining if a wheel slip condition is absent and for producing an enable signal after a given time, means for checking the feedback state of a wheel slip magnet valve and for monitoring the enable signal for setting a valve cutout means, means for reporting a wheel slip inhibit event when the logical output signal is received from the comparing means and a signal is received from a trainline, means for recording a safety time event, means for sensing a feedback fault function, and means for causing the wheel slip inhibit event, the safety timer event, and the feedback fault function to be logged for every brake to power transition cycle.

In accordance with the present invention, there is provided an electronic wheel slip control system for integrating three wheel slip safety functions for a railway vehicle comprising, a highest axle speed comparator for producing a signal representative of the highest axle speed on the vehicle, a comparator circuit for comparing the highest vehicle speed signal with a preset speed value and for producing a logical "0" when the highest vehicle speed signal is less than the preset speed value and for producing a logical "1" when the highest vehicle speed signal is greater than the preset speed value, a wheel slip inhibit event recorder for producing a logical "1" when a logical "1" is received from the comparator circuit and from a wheel slip inhibit trainline, a final fault code generation circuit for producing a logical "1" for logging the event of the wheel slip inhibit event recorder, a vehicle stop indicator for determining that the vehicle is effectively stopped and is in a brake mode for producing a logical "1", a vehicle stop timer for producing a logical "1" if the logical "1" received from the vehicle stop indicator is present for a predetermined time, a brake to power transition sensor for producing a logical "1" if the vehicle undergoes a brake to power transition during a program cycle, a fault code inhibit set/reset device for producing a logical "1" when set by a logical "1" from the vehicle stop timer and for producing a logical "0" when reset by a logical "1" from the brake to power transition sensor, a timer circuit for producing an enable signal if a wheel slip is not in progress and when the timer circuit reaches a predetermined count, a wheel slip magnet valve application state check circuit for producing an enable signal when conditioned by the enable signal of the timer and is enabled by any magnet valve state other than a brake application mode, a magnet valve cutout set/reset device which is set by the enable signal from the wheel slip magnet valve application state check circuit and which is reset by a signal received from a station stop initiated valve sensor, a feedback fault sensor for producing a logical "1" or a logical "0" in accordance with the set and reset conditions of the magnet valve cutout set/reset device and when the input received from the fault axle inhibit set/reset device is a logical "0", the final fault code generation circuit producing a logical "1" for logging a fault received from the feedback fault sensor, a safety timer event recorder for producing a logical "1" by a logical "1" received from a safety time set time until it is reset by a signal received from a wheel slip inhibit trainline, the final fault code generation circuit producing a logical "1" for logging an event received from the safety timer event recorder.

DESCRIPTION OF THE DRAWINGS

The above objects and other attendant features and advantages will be more readily appreciated as the present invention becomes better understood by reference to the following detailed description when considered in conjunction with the accompanying drawings, wherein:

The single Figure is a schematic circuit block diagram of a wheel slip magnet valve safety check and fault indication integrator for a wheel slip control system for a railway vehicle in accordance with the present invention.

DETAILED DESCRIPTION OF THE INVENTION

Referring now to the single Figure of the drawing, there is shown a schematic circuit block diagram for integrating the three (3) wheel slip control safety processes, namely, the wheel slip inhibit function, the safety timer output and the magnet valve feedback function and their respective diagnostic fault indications into a single interface unit. Normally, the railway transit car is a four-axle vehicle. The speed of each of the four wheel axle units is sensed and measured by a separate associated magnetic pickup device which may take the form of a conventional tachometer generator. Each of the tachometer generators is disposed in close proximity to a toothed wheel which is driven by each of the four wheel axle units. Thus, the magnetic generator senses the passing teeth of the driven gears to produce electrical signals or pulses which have a frequency proportional to the angular rotation of the respective gears. That is, the tachometer generators produce alternating current signals having a frequency which varies with the rotating speed or velocity of the wheel axle units. It will be appreciated that the output signal of each of the four magnetic pickup devices is connected to the input of a respective one of four suitable velocity measuring circuits. Each of the velocity measuring circuits is basically a converter which includes a pulse shaper, counters and buffer latches. It will be appreciated that the a.c. signals are fed to the pulse shaper which produces constant-amplitude square-wave pulses which have a repetition rate proportional to the input frequency. Next, the square-wave pulses are fed to a gating circuit which allows a high frequency clock input to the counters to produce an output which is inversely proportional to the frequency of the particular wheel axle unit being monitored. Then, the velocity count signals are fed to buffer latches which provide the necessary stabilization and isolation. It will be appreciated that the outputs of the four velocity measuring circuits are connected to the respective input terminals IT1, IT2, IT3, and IT4 of a highest axle speed comparator circuit HASC via leads L1, L2, L3, and L4, respectively. The highest axle speed circuit HASC compares the four speeds of the wheel axle units and performs a selection to determine which of the four speeds is the highest amplitude. The selected speed signal appears as the output of the comparator circuit HASC and is conveyed to the input of a vehicle speed versus a preset or preselected speed comparator circuit VSPSC via leads L5 and L6. The highest vehicular speed signal is compared to a preset speed value, such as seven miles per hour (7 mph). If the highest vehicular speed signal is less than 7 mph, the comparator circuit VSPSC will output a low or logical "0", and if the highest vehicular speed signal is equal to or greater than 7 mph, the comparator circuit VSPSC will output a high or logical "1".

It will be noted that the output of the highest axle speed comparator circuit HASC is also connected to one input of a vehicle stop indicator circuit VSIC via leads L5 and L7. The indicator circuit VSIC includes a comparator circuit which compares the highest vehicular speed signal with a preset speed limit or dead zero speed, such as, less than 1 mph. The other input of the vehicle stop indicator circuit is connected to terminal IT5 via lead L8. The input terminal IT5 is connected to the power/brake trainline which denotes the mode of operation. If the highest axle speed signal is less than 1 mph and if the vehicle is in a brake mode, an AND gate of the vehicle stop indicator circuit will output a high or logical "1", and if not, the output will be a low or logical "0".

It will be seen that the output of the vehicle stop indicator circuit VSIC is connected to the input of a vehicle stop timer VST via lead L9. The timer circuit VST determines whether the highest axle speed signal is less than 1 mph and whether the vehicle was in the brake mode for a predetermined time. That is, if the timer VST receives a logical "1" for ten seconds (10 sec.), it will output a high or logical "1" until it is reset to a logical "0" and a zero (0) time by a logical "0" received from the output vehicle stop indicator circuit VSIC.

As shown, the power/brake trainline terminal IT5 is also connected to the input of a brake to power transition sensor BPTS via leads L8 and L10. The function of the sensor BPTS is to sense when the vehicle has made a transition from a braking mode to a power mode. This function can be performed by a monostable multi-vibrator, namely, a one-shot trigger circuit, which causes a flip-flop action. A trigger pulse is required to flip the state of the one-shot multivibrator which of its own accord flips back to its original state. If a transition occurs, the sensor circuit BPTS will output a logical "1" for one program cycle before returning to a logical "0" output.

As shown, the output of the vehicle stop timer VST is connected to one input of a fault code inhibit set/reset device FCID via lead L11, while the output of the brake to power transition is connected to the other input of the fault code inhibit set/reset device FCID via lead L12. The function of the fault code inhibit device FCID is to set a flag which will be used to inhibit all magnet valve feedback faults during a condition in which vehicle is both stopped and in a brake mode for longer than the preset 10 sec. time period. This function may be performed by a bistable multivibrator circuit in which one trigger pulse flips the state of the circuit and another trigger pulses flops the circuit back to its original state. When the vehicle stop timer conveys a logical "1" to the fault code inhibit set/reset device FCID, it sets its output to a logical "1". The output will remain a logical "1" until the fault code inhibit set/reset device is reset by a logical "1" from the brake to power transition sensor BPTS. The device remains in a reset condition until another logical "1" input is received from the vehicle stop timer VST.

As shown, wheel slip magnet valve application state check circuit MVASC is connected to stop terminal IT6 via lead L13 and to input terminal IT7 via lead L15. The input signal appearing on terminal IT6 is derived from the wheel slip control logic which signifies whether a slip condition is in progress or not. The input signal appearing on terminal IT7 is derived from the magnet valve state feedback. The wheel slip magnet valve application state check circuit MVASC is preferably an AND gate, with a valve NOT-IN application and a wheel slip condition NOT in progress being high signals. An enabled signal from the wheel slip magnet valve application state clock circuit MVASC is to be connected to the input terminal of a timer T via lead L14. If the input signal to timer T is enabled for a continuous time period of 0.50 seconds, an enable signal will be conveyed to one input of the magnet valve cutout set/reset device MVCD, such as, a flip-flop circuit via lead L16. The valve cutout set/reset device VCSRD will remain set until by a reset signal is developed on input terminal IT8 which is connected to its other input via lead L17. The input signal on terminal IT8 is derived from a station stop initiated value initialization routine sensor (warm start).

As shown, the output of the speed comparator circuit VSPSC is connected by lead L18 to one input of a wheel slip inhibit event recorder WSIER. The other input of the wheel slip inhibit event recorder WSIER is connected to terminal IT9 via leads L19 and L20. The signal appearing on terminal IT9 is derived from the wheel slip inhibit trainline. The wheel slip inhibit event recorder WSIER is basically an AND gate which will output a high or logical "1" only if it receives a logical "1" from the speed comparator circuit VSPSC and the wheel slip inhibit signal from the trainline. That is, the wheel slip inhibit event recorder WSIER outputs a wheel slip inhibit event record signal only if the speed comparator circuit VSPSC denotes that the vehicle speed is greater than the preset speed limit.

It will be seen that one input of a safety time event recorder STER is connected by leads L19 and L21 to the wheel slip inhibit trainline terminal IT9, while the other input is connected to terminal IT10 via leads L22 and L23. The logic input appearing on terminal IT10 is derived from a safety timer cutout sensor which outputs a logical "1" if the safety timer set sensor is a logical "1" and will remain so until it is reset to a logical "0" by a signal received from the wheel slip inhibit trainline. That is, an indication of a safety timeout will be generated by the safety timer event recorder STER only if a wheel slip inhibit signal is not developed on terminal IT9.

It will be noted that a feedback fault sensor FFS has one input connected by lead L24 to the output of the fault code inhibit set/reset device FCID, while the other input is connected by leads L25 and L26 to the output of the magnet valve cutout set/reset device MVCD. The output of the feedback fault sensor FFS will follow the logical input received from the magnet valve cutout device MVCD when the input from fault code inhibit device FCID is a logical "0". It will be understood that the output of the feedback fault sensor FFS will be a logical "0" when the input received from the fault code inhibit device FCID is a logical "1". In other words, if a flag is set by the fault code inhibit device FCID, any valve cutout request will not result in a fault output from the feedback fault sensor FFS. On the other hand, if a flag is not set by the fault code inhibiting device FCID, any valve cutout request will result in a fault output from the feedback fault sensor FFS.

As shown, a magnet valve cutout circuit MVCC receives a first logic input from the safety time cutout sensor terminal IT10 via leads L22 and L27. A second logic input is received from the magnet valve cutout set/reset device via leads L25 and L28. A third input is connected to wheel slip inhibit trainline terminal IT9 via leads L19 and L29. The magnet valve cutout circuit MVCC functions as a simple three-input OR gate circuit which conveys a logical "1" to the vital magnetic valve cutout terminal OT1 via lead L35 when any one of the three valve cutout requests is a logical "1". Thus, the output of the magnet valve cutout circuit MVCC provides a one point or single interface unit for the three safety functions. Thus, the single interface avoids possible confusion during troubleshooting since all three safety logic functions are monitored together and provides detailed maintenance diagnostic and operational event information in a simple format.

It will be seen that a final fault generation circuit FFCGC receives one input from the wheel slip inhibit event recorder WSIER via lead L30 and receives a second input from the safety timer event recorder STER via lead L31. A third input is connected by lead L32 to the feedback fault sensor FFS, while a fourth input is connected by leads L12 and L33 to the brake to power transition sensor BPTS. The output of the final fault code generation circuit is connected to the fault code log terminal OT2 via lead L34. Thus, the occurrence of any event or fault that is inputted to the final fault code generation circuit FFCGC is logged one for every brake to power transition cycle in which the output of the brake to power transition sensor changes from a logical "1" to a logical "0". Each of the occurring event or fault will generate a specific code and a general code which is conveyed to the fault code log terminal OT2 via lead L34.

The following is a summation of the various functions which are achieved by the present magnet valve safety check and fault indication integrating system. As previously noted, the wheel slip inhibit function, the safety timer output, and the magnet valve feedback function are integrated or combined to form a single interface with the vital magnet valve cutout function. Each of the above-noted safety functions will effectively operate when requested, regardless of whether event or fault will be reported or not. The wheel slip inhibit event will only be reported if the railway vehicle is traveling above a preset speed. The safety timer event will only be recorded if a wheel slip inhibit event has not been previously reported. The magnet valve feedback fault will only be reported if the railway vehicle has been operational or has been out of the braking mode for a preselected time limit. The magnet cutouts are logged under one general event code in a general event and fault code log and under three specific event and fault codes in a specific event and fault code log. Further, it will be appreciated that only one of each event and fault code can be logged for every brake to power transition cycle. Accordingly, the system provides a comprehensive handling of wheel slip control valve safety in operation and an intelligent determination and report of events and faults. This system eliminates the need for additional or ancillary interfaces and provides a comprehensive wheel slip safety approach, and thus resulting in the increase of overall process reliability. In addition, thus arrangement utilizes car dynamic operation information to determine whether a fault should be reported and thus it eliminates the generation of erroneous faults which may be caused during normal operation or during maintenance procedures.

It will be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate output. Therefore, it will be appreciated that certain modifications, ramifications, and equivalents will be readily apparent to persons skilled in the art, and accordingly it is understood that the present invention should not be limited to the exact embodiment shown and described, but should be accorded the full scope and protection of the appended claims.

We claim:

1. A magnet valve safety check and fault indication integrator comprising, means for selecting a highest axle speed of a plurality of wheel axle units of a railway vehicle, means for comparing the highest axle speed to a preset speed for producing a logical output signal, means for indicating the vehicle is stopped by comparing the highest speed with a preset speed limit, first means for sensing a transition from a braking mode to a power mode for producing a logical output signal means for timing that the highest speed is less the preset speed limit and in a brake mode for predetermined time for producing a logical output signal, fault code inhibit means being set by the logical output signal of the timing means and being reset by the logical output signal of the transition means, means for determining if a wheel slip condition is absent and for producing an enable signal after a given time, means for checking a feedback state of a wheel slip magnet valve and for monitoring the enable signal for setting a valve cutout means, means for reporting a wheel slip inhibit event when the logical output signal is received from the comparing means and a signal is received from a trainline, means for recording a safety time event, second means for sensing a feedback fault function, and means for causing the wheel slip inhibit event, the safety timer event, and the feedback fault function to be logged for every brake to power transition cycle.

2. The magnet valve safety check and fault indication integrator as defined in claim 1, wherein the selecting means is a comparator circuit.

3. The magnet valve safety check and fault indication integrator as defined in claim 1, wherein the comparing means is a comparator circuit.

4. The magnet valve safety check and fault indication integrator as defined in claim 1, wherein the indicating means is a comparator circuit.

5. The magnet valve safety check and fault indication integrator as defined in claim 1, wherein the first sensing means is a monostable multivibrator.

6. The magnet valve safety check and fault indication integrator as defined in claim 5, wherein the monostable multivibrator operates in a flip-flop manner.

7. The magnet valve safety check and fault indication integrator as defined in claim 1, wherein the fault code inhibit means is bistable multivibrator.

8. The magnet valve safety check and fault indication integrator as defined in claim 1, wherein the determining means is a timer circuit.

9. The magnet valve safety check and fault indication integrator as defined in claim 1, wherein the checking means is a flip-flop circuit.

10. The magnet valve safety check and fault indication integrator as defined in claim 1, wherein the means for causing the wheel slip inhibit event, the safety timer event, and the feedback fault function to be logged for every brake to power transition cycle is an OR gate circuit.

11. An electronic wheel slip control system for integrating three wheel slip safety functions for a railway vehicle comprising, a highest axle speed comparator for producing a signal representative of a highest axle speed on the vehicle, a comparator circuit for comparing the highest vehicle speed signal with a preset speed value and for producing a logical "0" when the highest vehicle speed signal is less than the preset speed value and for producing a logical "1" when the highest vehicle speed signal is greater than the preset speed value, a wheel slip inhibit event recorder for producing a logical "1" when a logical "1" is received from said comparator circuit and from a wheel slip inhibit trainline, a final fault code generation circuit for producing a logical "1" for logging the event of said wheel slip inhibit event recorder, a vehicle stop indicator for determining that the vehicle is effectively stopped and is in a brake mode for producing a logical "1", a vehicle stop timer for producing a logical "1" if the logical "1" received from said vehicle stop indicator is present for a predetermined time, a brake to power transition sensor for producing a logical "1" if the vehicle undergoes a brake to power transition during a program cycle, a fault code inhibit set/reset device for producing a logical "1" when set by a logical "1" from said vehicle stop timer and for producing a logical "0" when reset by a logical "1" from said brake to power transition sensor, a timer circuit for producing an enable signal if a wheel slip is not in progress and when said timer circuit reaches a predetermined count, a wheel slip magnet valve application state check circuit for producing an enable signal when conditioned by the enable signal of said timer circuit and is enabled by any magnet valve state other than a brake application mode, a magnet valve cutout set/reset device which is set by the enable signal from said wheel slip magnet valve application state check circuit and which is reset by a signal received from a station stop initiated valve sensor, a feedback fault sensor for producing a logical "1" or a logical "0" in accordance with set and reset conditions of said magnet valve cutout set/reset device and when an input received from said fault code inhibit set/reset device is a logical "0", said final fault code generation circuit producing a logical "1" for logging a fault received from said feedback fault sensor, a safety timer event recorder for producing a logical "1" by a logical "1" received from a safety time cutout sensor until it is reset by a signal received from a wheel slip inhibit trainline, said final fault code generation circuit producing a logical "1" for logging an event received from said safety timer event recorder.

12. The electronic wheel slip control system as defined in claim 11, wherein a magnet valve cutout circuit for receiving a first logic input from said safety time cutout sensor, for receiving a second logic input from said magnet valve cutout set/reset device, and for receiving a third logic input from said wheel slip inhibit trainline.

13. The electronic wheel slip control system as defined in claim 12, wherein said magnet valve cutout circuit is an OR gate.

14. The electronic wheel slip control system as defined in claim 11, wherein said brake to power transition sensor is a one-shot trigger circuit.

15. The electronic wheel slip control system as defined in claim 11, wherein said fault code inhibit set/reset device is a bistable multivibrator.

16. The electronic wheel slip control system as defined in claim 11, wherein said magnet valve cutout set/reset device is a flip-flop circuit.

* * * * *